(12) United States Patent
Jiang

(10) Patent No.: US 7,384,374 B2
(45) Date of Patent: Jun. 10, 2008

(54) TIP-IN/TIP-OUT GEAR SHIFT CONTROL FOR A POWERSHIFT AUTOMATIC TRANSMISSION

(75) Inventor: Hong Jiang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 11/311,032

(22) Filed: Dec. 16, 2005

(65) Prior Publication Data

US 2007/0142171 A1    Jun. 21, 2007

(51) Int. Cl.
  *B60W 10/02*  (2006.01)
  *B60W 10/10*  (2006.01)
(52) U.S. Cl. .......................... 477/120; 74/340
(58) Field of Classification Search ............. None
  See application file for complete search history.

(56) References Cited

U.S. PATENT DOCUMENTS

| | | | |
|---|---|---|---|
| 4,497,222 A | | 2/1985 | Nagaoka et al. |
| 4,790,418 A | * | 12/1988 | Brown et al. ................. 701/51 |
| 5,592,851 A | | 1/1997 | Bates et al. |
| 5,950,781 A | * | 9/1999 | Adamis et al. ............ 192/3.61 |
| 6,443,025 B2 | | 9/2002 | Ohashi et al. |
| 6,536,569 B2 | | 3/2003 | Nishimura |
| 6,547,698 B2 | | 4/2003 | Inagawa et al. |
| 6,588,292 B2 | * | 7/2003 | Yamasaki et al. ............. 74/340 |
| 6,599,216 B1 | | 7/2003 | Wafzig et al. |
| 6,705,964 B2 | | 3/2004 | Nagai et al. |
| 6,887,184 B2 | * | 5/2005 | Buchanan et al. .......... 477/174 |
| 6,926,638 B1 | | 8/2005 | Gimmler et al. |
| 6,931,315 B2 | | 8/2005 | Ayabe et al. |
| 2004/0153232 A1 | | 8/2004 | Wada et al. |
| 2004/0158382 A1 | | 8/2004 | Furuichi et al. |
| 2004/0180755 A1 | * | 9/2004 | Kupper et al. ............. 477/120 |
| 2004/0266584 A1 | | 12/2004 | Janson et al. |
| 2005/0028625 A1 | | 2/2005 | Hatakeyama |
| 2005/0064987 A1 | * | 3/2005 | Budal et al. .................... 477/3 |
| 2005/0064991 A1 | | 3/2005 | Bemz |
| 2005/0096180 A1 | | 5/2005 | Wadas et al. |
| 2006/0040787 A1 | | 2/2006 | Dreher |

FOREIGN PATENT DOCUMENTS

WO    WO2006/084530    8/2006

* cited by examiner

*Primary Examiner*—Sherry Estremsky
*Assistant Examiner*—Edwin A Young
(74) *Attorney, Agent, or Firm*—David B. Kelley; MacMillan, Sobanski & Todd, LLC

(57) ABSTRACT

A method for shifting a transmission from a current gear to a target gear following release of an accelerator pedal, the transmission having first and second clutches for alternately connecting and disconnecting a power source and first and second input shafts, respectively, first couplers for alternately connecting and disconnecting a transmission output and a first set of gears driveably connected to the first clutch, and second couplers for alternately connecting and disconnecting the output and a second set of gears driveably connected to the second clutch. The steps include disengaging the first and second clutches, using a first coupler to maintain a drive connection between the output and the current gear, determining a target gear, using the target gear to determine a preselected gear, actuating a coupler to produce a drive connection between the output and the preselected gear, and engaging one of the first and second clutches such that said clutch driveably connects the power source to the output through said coupler and preselected gear.

16 Claims, 4 Drawing Sheets

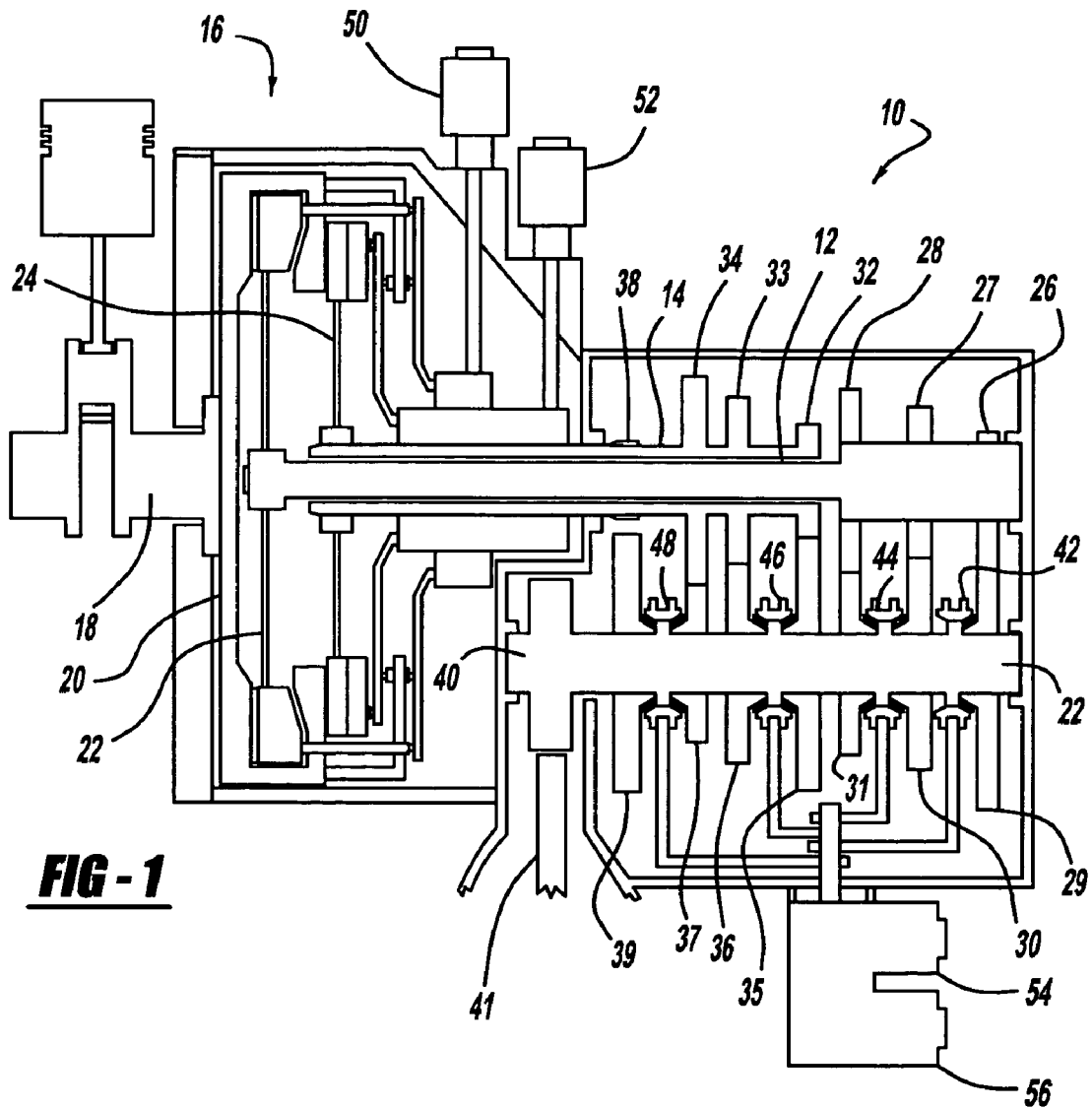

TIP-IN/TIP-OUT GEAR SHIFT CONTROL FOR A POWERSHIFT AUTOMATIC TRANSMISSION

BACKGROUND OF THE INVENTION

The present invention relates to the control of gear changes in an automatic transmission for a motor vehicle. More particularly, it pertains to a strategy for controlling gear changes following a change-of-mind event in a powershift transmission.

A change-of-mind shift occurs when the operator of a motor vehicle equipped with an automatic transmission depresses the accelerator pedal, called a "tip-in," and immediately releases the pedal, called a "tip-out" or "back-out." A change-of-mind shift can occur also when the vehicle operator releases the accelerator pedal, then immediately depresses the pedal. If the transmission were operating in third gear when the change-of-mind event occurs, an upshift through several gears to sixth gear might be immediately followed by a downshift to third gear. Change-of-mind gear shifts are very difficult to handle in a powershift transmission, and they require a relatively long period to complete due to the need for coordinated engagement and disengagement of several synchronizers or couplers during the shift. In some cases, the transmission performs a single upshift, such as a 6-3 shift, when the driver tips-in. Such shifts cause the operator to sense a lengthy, unacceptable delay in completing the shift, and the shift may be accompanied by a bump or harsh shift feel. Vehicle occupants regard such sensations as unacceptable shift quality.

There is a need promptly to stabilize gear changes in a powershift transmission following a change-of-mind event. There is a need to eliminate harshness and delay in completing gear changes following the event that initiates automatic gear changes in the transmission.

SUMMARY OF THE INVENTION

The control strategy of this invention employs a neutral idle concept during back-out and coasting to handle change-of-mind shifts. Neutral idle enables the transmission to stay in a neutral state while the accelerator pedal is closed, to preselect preferred next gear, and to disposition the transmission for a rapid gear change to the preselected gear for the next tip-in. While neutral idle is enabled, the engine speed drops to idle speed without upshifts, the clutch torque capacity is zero, and the clutch is in the stroke position. Therefore, most of the change-of-mind shifts are eliminated and the transmission shifts from the current gear to a higher gear following a tip-in when higher vehicle speeds are expected by the operator. Engine torque control is used during these tip-in events to provide a smooth transition without creating excessive slip. During a tip-in event, clutch slip is controlled by engine torque, instead of by clutch torque, which is the conventional technique for controlling clutch slip. After the operator driver stays in coast mode long enough, a higher gear will be selected by engaging a synchronizer or coupler based on the vehicle speed. If the driver tip-ins from a coast condition, the appropriate clutch will engage, thereby producing the current gear without a shift.

The control of this invention eliminates change-of-mind shifts instead of improving them. It enables the powershift transmission to provide the best change-of-mind shift quality and the desired wheel torque the driver wants and expects. It also enables the transmission to provide the best response to the driver demanded tip-in and tip-out.

A method for shifting a transmission from a current gear to a target gear following release of an accelerator pedal, the transmission having first and second clutches for alternately connecting and disconnecting a power source and first and second input shafts, respectively, first couplers for alternately connecting and disconnecting a transmission output and a first set of gears driveably connected to the first clutch, and second couplers for alternately connecting and disconnecting the output and a second set of gears driveably connected to the second clutch. The steps include disengaging the first and second clutches, using a first coupler to maintain a drive connection between the output and the current gear, determining a target gear, using the target gear to determine a preselected gear, actuating a coupler to produce a drive connection between the output and the preselected gear, and engaging one of the first and second clutches such that said clutch driveably connects the power source to the output through said coupler and preselected gear.

The scope of applicability of the present invention will become apparent from the following detailed description, claims, and drawings. It should be understood, that the description and specific examples, although indicating preferred embodiments of the invention, are given by way of illustration only. Various changes and modifications to the described embodiments and examples within the spirit and scope of the invention will become apparent to those skilled in the art.

DESCRIPTION OF THE DRAWINGS

These and other advantages of the present invention will become readily apparent to those skilled in the art from the following detailed description of a preferred embodiment when considered in the light of the accompanying drawings in which:

FIG. 1 is a schematic diagram of a twin clutch powershift automatic transmission to which the shift control strategy of this invention may be applied;

FIG. 2 is chart showing the coupler and the corresponding gears of FIG. 1 with which they are associated;

DESCRIPTION OF THE PREFERRED EMBODIMENT

Figure 3:
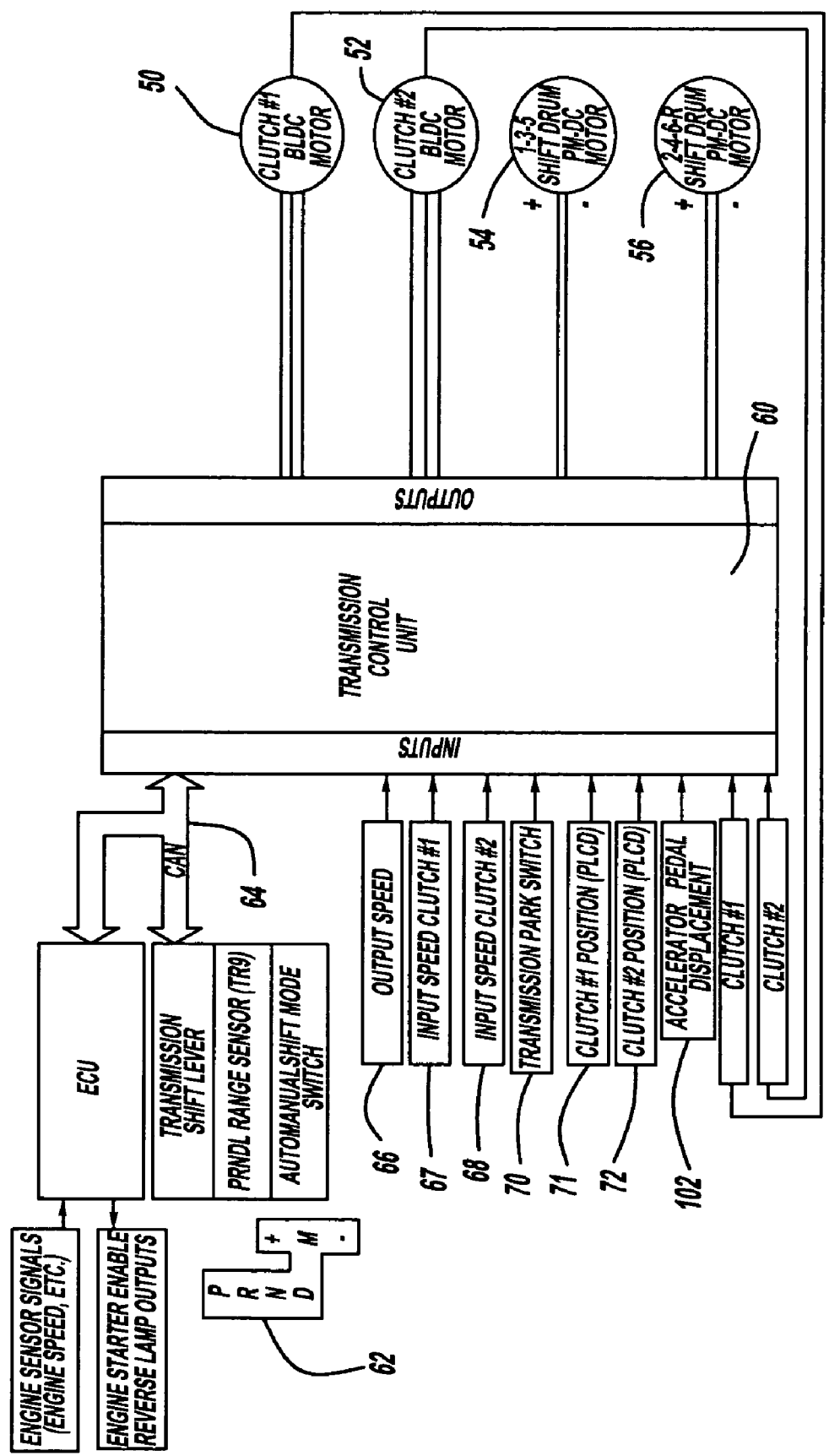
FIG. 3 is a schematic diagram of an electronic system for controlling the transmission following a change-of-mind event.

Referring now to FIG. 1, the powershift transmission 10 includes a first input shaft 12 associated with the odd-numbered forward speed ratios, and a second input shaft 14 associated with the even-numbered forward speed ratios and reverse drive. Input shaft 14 is a sleeve shaft surrounding input shaft 12. A dual clutch mechanism 16 produces a drive connection between the crank shaft 18 of an engine or another power source to the first and second input shafts 12, 14. The clutch mechanism 16 includes a flywheel 20, which is driveably connected to crankshaft 18 and is alternately driveably connected to and disconnected from input shaft 12 when clutch 22 is engaged and disengaged, respectively.

Flywheel 20 is alternately driveably connected to and disconnected from input shaft 14 when clutch 24 is engaged and disengaged, respectively.

Preferably input shaft 12 is formed with pinions 26, 27, 28 for the first, second, and third speed ratios. Each pinion 26-28 is in meshing engagement with a corresponding gear 29, 30, 31, each gear being journalled on an output shaft 32. Similarly, the second input shaft 14 is preferably formed with pinions 32, 33, 34 for the second, fourth, and sixth forward speed ratios, and a reverse pinion 38. Each pinion 32-34 is in meshing engagement with a corresponding gear 35, 36, 37, each gear being journalled on output shaft 32. The reverse drive pinion 38 is in meshing engagement with a reverse idler (not shown), which meshes with a reverse output gear 39, journalled on the output shaft 32. A final drive pinion 40, secured to output shaft 32, meshes with a final drive gear 41, which transmits power to the axles of the driven wheels of the vehicle.

A synchronizer 42 alternately driveably connects the first speed gear 29 with the output shaft 32 when the sleeve of the synchronizer is displaced rightward from the neutral position shown in FIG. 1 and disconnects gear 29 from shaft 32 when the sleeve is in the neutral position. A second synchronizer 44 alternately connects and disconnects the third speed gear 30 and the fifth speed gear 31 with output shaft 32 depending on the axial position of the selector sleeve of synchronizer 44. Similarly, synchronizer 46 alternately connects and disconnects the second speed gear 35 and the fourth speed gear 36 with output shaft 32 depending on the axial position of the selector sleeve of synchronizer 46. Synchronizer 48 alternately connects and disconnects the sixth speed gear 37 and the reverse gear 39 to the output shaft depending on the axially position of its selector sleeve. In FIG. 1, all of the synchronizers 42, 44, 46, 48 are shown with their selector sleeves in the neutral position.

Clutches 22 and 24 are preferably normally open clutches, which may be actuated electro-mechanically, but those clutches may be normally-closed. A first, electromechanical actuator 50 engages and disengages clutch 22; a second actuator 52 engages and disengages clutch 24. The selector sleeves of synchronizers 42 and 44 are actuated by an electromechanical actuator 54; the selector sleeves of synchronizers 46 and 48 are actuated by an electromagnetic actuator 56.

The transmission is controlled such that it produces a current or active gear upon engaging one of the input clutches 22, 24 after the selector sleeve of the corresponding synchronizer has been moved to a state that produces a drive connection between current gear and the output shaft 32. In addition, the transmission is controlled to produce a preselected gear, which is produced by changing the position of the selector sleeve of the corresponding synchronizer to produce a drive connection between the output shaft and the preselected gear and by disengaging the clutch 22, 24 associated with the preselected gear.

The chart of FIG. 2 shows that the sleeve of synchronizer 42 moves rightward from the neutral position to connect the first gear 29 to the output shaft 32. The sleeve of synchronizer 44 moves rightward from the neutral position to connect third gear 30 to the output shaft 32 and moves leftward from the neutral position to connect the fifth gear 31 to the output shaft. The sleeve of synchronizer 46 moves rightward from the neutral position to connect gear 35 to the output shaft 32 and moves leftward from the neutral position to connect the fourth gear 36 to the output shaft. The sleeve of synchronizer 48 moves rightward from the neutral position to connect the sixth gear 37 to the output shaft and moves leftward from the neutral position to driveably connect the reverse gear 39 to the output shaft.

FIG. 3 shows the arrangement of an electronic system for controlling the actuation of clutches 22 and 24 through operation the clutch actuators 50, 52, and for actuating the synchronizers 42, 44, 46, 48 through operation on the synchronizer actuators 54, 56. A transmission control unit (TCU) 60, which is accessible to electronically stored, coded algorithms, responds to the various inputs, executes the control algorithms, and produces electronic command signal to the actuators 50, 52, 54, 56. The position or displacement of the actuators is carried back as input to the TCU 60. The position of a transmission shift lever 62 is communicated on CAN 64 to the TCU input, and communications among various sensors, the TCU and actuators is carried on the CAN. Speed sensors 66, 67, 68 produce electronic signals representing the speed of output 32, the speed of input 12, and speed of input 14. Other TCU inputs include state of a transmission park switch 70, the position or state 71 of clutch 22, and the engaged or disengaged state 72 of clutch 24. The magnitude of displacement of an accelerator pedal 102 is another TCU input.

Figure 4:
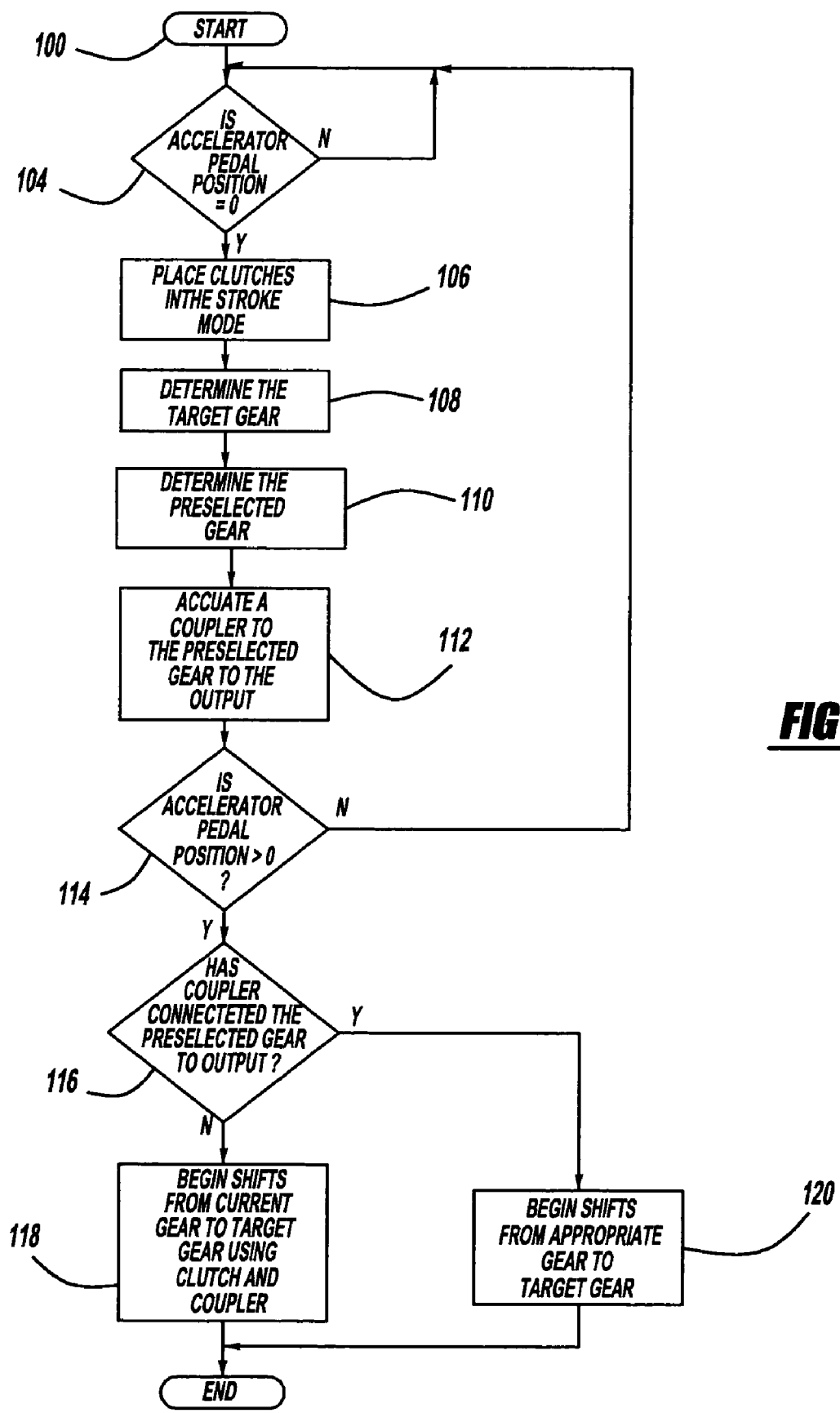
FIG. 4 is a logic flow diagram of the strategy for controlling a change-of-mind event.

FIG. 4 is a logic flow diagram illustrating the steps for controlling engagement and disengagement of the clutches 22, 24 and for controlling the connections made by the synchronizers or couplers 42, 44, 46, 48 during a sequence of displacements of the accelerator pedal 102 by the vehicle operator. That sequence, called a "change-of-mind" event, begins with an abrupt release or tip-out of the pedal followed shortly thereafter by a depression or tip-in of the pedal. In an automatic transmission, whose kinematic arrangement is a dual clutch-layshaft or a conventional torque converter-planetary gearset, that sequence normally induces a gear ratio change or shift.

The control strategy for a change-of-mind event begins at step 100 upon the release of the accelerator pedal 102. Displacement of the pedal from a released position is represented by counts produced electronically by a sensor and supplied to the input of the TCU 60. The control system continually monitors the accelerator pedal displacement sensor 102 to determine whether the pedal is released.

When the test at step 104 is true, clutches 12 and 14 are placed in a stroke position at step 106, i.e., the torque capacity of both clutches is reduced to zero by actuators 50, 52, but each clutches is in position to be immediately engaged upon minimal displacement of the respective actuator.

Figure 5:
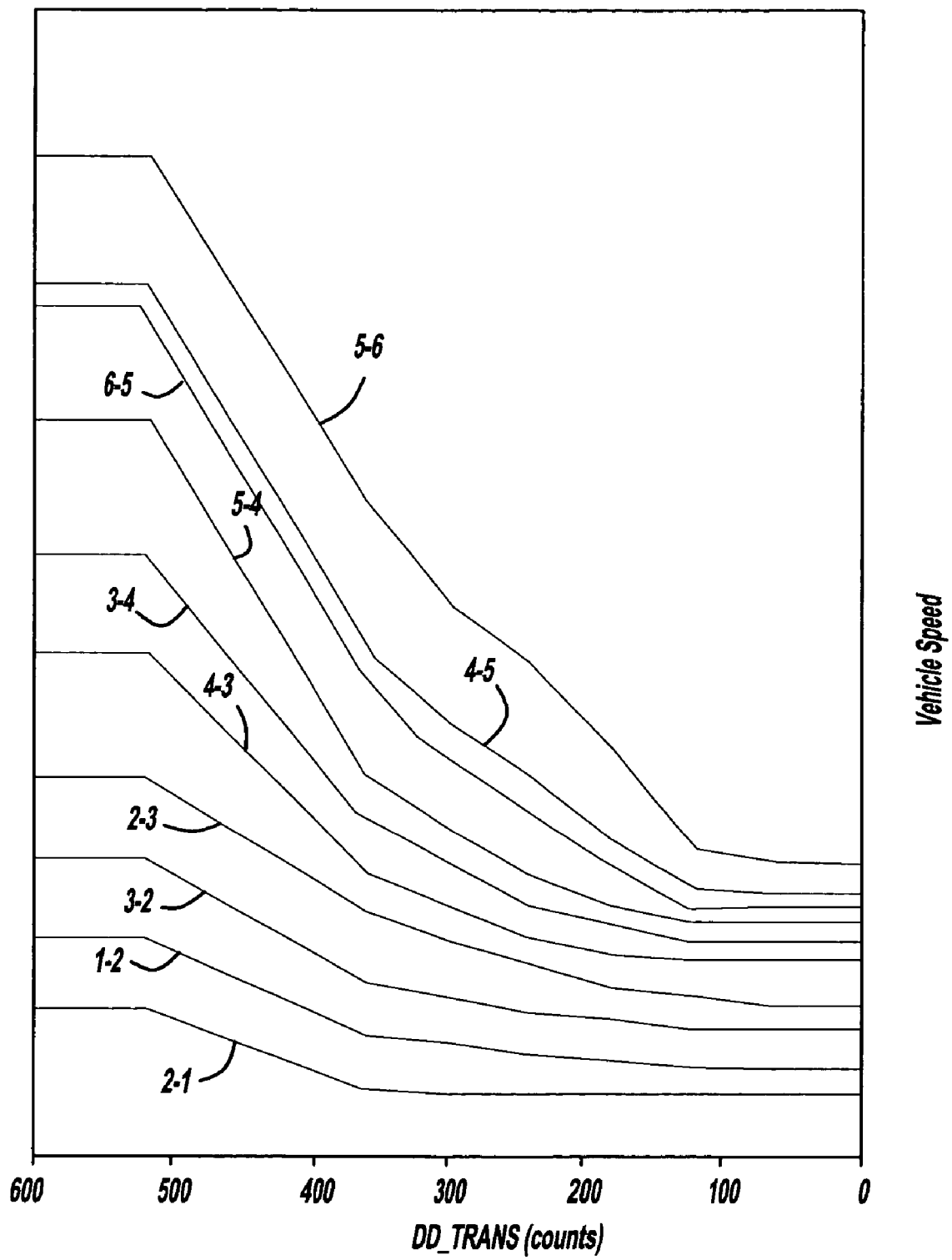
FIG. 5 is a graph showing the relation between displacement of the accelerator pedal and vehicle speed for each of the upshifts and downshifts of the transmission.

At step 108, the control determines a target gear. FIG. 5 is a graph showing, for the operating state of the motor vehicle represented by vehicle speed and displacement of the accelerator pedal, where each upshift and downshift is commanded by the TCU 60. When the operating state of the motor vehicle crosses one of the gear change lines, the TCU 60 commands a change from the current gear to the target gear. In this way at step 108, the target gear is determined.

However, when the gear changes are controlled by the strategy of the present invention, instead of immediately commanding a gear ratio change to the target gear when the accelerator pedal is released, at step 110 the control strategy determines a preselected gear, which may be different from the target gear. For example, if the current gear is the third gear and the accelerator pedal is released, the target gear determined from schedule of FIG. 5 may be the sixth gear and the preselected gear will also be the sixth gear. However, if the transmission is operating in the third gear and the target gear is fifth gear, the preselected gear will be fourth gear because the fifth gear is associated with clutch 22 and input shaft 12, the same clutch and same input shaft with which third gear is associated. If, the target gear is the fourth gear, then the preselected gear will become the fourth gear because that fourth gear is associated with clutch 24 and input shaft 14, a clutch and input shaft that are different from those with which third gear is associated.

After the preselected gear is determined at step 110, at step 112 one of the actuators 54, 56 will actuate the coupler that will driveably connect the preselected gear to the output 32. For example, if fourth gear is the preselected gear, the selector sleeve of coupler 46 is moved leftward by actuator 56 to connect gear 36 to output shaft 32, but clutch 24 remains disengaged. The current gear, third gear, remains driveably connected to the output shaft 32 through its coupler 44. But input shafts 12, 14 are disconnected from crankshaft 18 because both clutches 22, 22 are in the stroke position.

The control continues to monitor displacement of the accelerator pedal 102. At step 114, if accelerator pedal position is depressed, as represented by a count greater than zero, control passes to step 116 where the control determines whether the coupler actuated in step 112 has completed making the drive connection of the preselected gear to the output 32. If the drive connection has not been completed, control passes to step 118 where the TCU 60 issues a command to re-engage the clutch associated with the current gear. For the example referred to above, if the third gear is the current gear, then clutch 22 is re-engaged. Thereafter, upshifts from the current gear to the target are performed sequentially by disengaging the engaged clutch 12 and engaging the disengaged clutch 14 while manipulating the couplers so that stepwise, sequential gear changes occur between the current gear and the target gear.

If the coupler actuated at step 112 has completed the drive connection of the preselected gear to the output 32, control passes to step 120 where the control causes clutch 14, which is not associated with the current gear, third gear, becomes engaged and driveably connects the preselected gear, fourth gear, to the output 32. If the current gear is the preselected gear, then the clutch that is associated with the current gear is engaged instead.

In the example referred to throughout the description, the current gear is the third gear and the preferred target gears are fourth gear and sixth gear. If this is the case, clutch 24 is engaged at step 120. However, if the preselected gear is the third gear, then at step 120, clutch 22 is re-engaged.

Throughout the description reference is made to the couplers being synchronizers, but they could be dog clutches, which produce no speed synchronization before the couplers driveably connect the output gears to the output shaft 32.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for shifting a transmission from a current gear to a target gear following a release of an accelerator pedal, the transmission having first and second clutches for alternately connecting and disconnecting a power source and first and second input shafts, respectively, first couplers for alternately connecting and disconnecting a transmission output and a first set of gears driveably connected to the first clutch, and second couplers for alternately connecting and disconnecting the output and a second set of gears driveably connected to the second clutch, comprising the steps of:
   (a) stroking the first and second clutches to zero torque capacity;
   (b) using a first coupler to maintain a drive connection between the output and the current gear;
   (c) determining a target gear;
   (d) using the target gear to determine a preselected gear;
   (e) actuating a coupler to produce a drive connection between the output and the preselected gear; and
   (f) engaging one of the first and second clutches such that said clutch driveably connects the power source to the output through said coupler and preselected gear.

2. The method of claim 1 further comprising:
upshifting from the preselected gear to the target gear.

3. The method of claim 1 wherein:
step (e) further comprises actuating a second coupler to produce a drive connection between the output and the preselected gear; and
step (f) further comprises:
if the accelerator pedal is displaced before the second coupler completes said drive connection, engaging the first clutch; and
if the target gear is a higher gear than the current gear, upshifting in successive gear steps to the target gear from the current gear.

4. The method of claim 1 wherein:
step (e) further comprises actuating a second coupler to produce a drive connection between the output and the preselected gear; and
step (f) further comprises:
if the accelerator pedal is displaced after the second coupler completes said drive connection, engaging the second clutch; and
if the target gear is a higher gear than the preselected gear, upshifting in successive gear steps to the target gear from the preselected gear.

5. The method of claim 1 wherein step (a) further comprises:
placing the first and second clutches in a stroke mode, in which a torque capacity of said clutches is zero and said clutches can be engaged promptly upon displacement of an actuator.

6. The method of claim 1 wherein step (c) further comprises:
establishing a schedule relating vehicle speed to the accelerator pedal displacement at which upshifts and downshifts from the current gear are to occur; and
using the current vehicle speed and the schedule to determine the target gear.

7. The method of claim 1 wherein step (d) further comprises:
if the target gear is a member of the second set of gears, and is a higher gear than the current gear, setting the preselected gear equal to the target gear.

8. The method of claim 1 wherein step (d) further comprises:
if the target gear is a member of the first set of gears and is a higher gear than the current gear, setting the preselected gear equal to that gear of the second set of gears that is one gear higher than the current gear.

9. A method for shifting a transmission from a current gear to a target gear, the transmission having first and second clutches for alternately connecting and disconnecting a power source and first and second input shafts, respectively, first couplers for alternately connecting and disconnecting a transmission output and a first set of gears driveably connected to the first clutch, and second couplers for alternately connecting and disconnecting the output and a second set of gears driveably connected to the second clutch, comprising the steps of:
- (a) operating the transmission in a current gear with the first clutch engaged and a first coupler driveably connecting a gear of the first set to the output;
- (b) monitoring displacement of an accelerator pedal;
- (c) disengaging the first and second clutches upon release of the accelerator pedal to an undisplaced position;
- (d) using the first coupler to maintain a drive connection between the output and the current gear;
- (e) determining a target gear;
- (f) using the target gear to determine a preselected gear;
- (g) actuating a second coupler to produce a drive connection between the output and the preselected gear; and
- (h) engaging the second clutch to driveably connect the power source to the output through the second coupler and the preselected gear.

10. The method of claim 9 further comprising:
actuating the first coupler to produce a drive connection between the output and a gear of the first set that is a higher gear than the current gear;
disengaging the second clutch; and
engaging the first clutch.

11. The method of claim 9 wherein step (h) further comprises:
if the accelerator pedal is displaced before the second coupler completes said drive connection, engaging the first clutch; and
if the target gear is a higher gear than the current gear, upshifting in successive gear steps to the target gear from the current gear.

12. The method of claim 9 wherein step (h) further comprises:
if the accelerator pedal is displaced after the second coupler completes said drive connection, engaging the second clutch; and
if the target gear is a higher gear than the preselected gear, upshifting in successive gear steps to the target gear from the preselected gear.

13. The method of claim 9 wherein step (h) further comprises:

If the accelerator pedal is displaced after the second coupler completes said drive connection, disengaging the second clutch and reengaging the first clutch.

14. The method of claim 9 wherein step (f) further comprises:
if the target gear is a gear of the second set and a higher gear than the current gear, setting the preselected gear equal to the target gear.

15. The method of claim 9 wherein step (f) further comprises:
if the target gear is a gear of the first set, and is a higher gear than the current gear, setting the preselected gear equal to that gear of the second set of gears that is one gear higher than the current gear.

16. A controller for shifting a transmission from a current gear to a target gear, the transmission having first and second clutches for alternately connecting and disconnecting a power source and first and second input shafts, respectively, first couplers for alternately connecting and disconnecting a transmission output and a first set of gears driveably connected to the first clutch, and second couplers for alternately connecting and disconnecting the output and a second set of gears driveably connected to the second clutch, comprising the controller configured to:
- (a) operate the transmission in a current gear with the first clutch engaged and a first coupler driveably connecting a gear of the first set to the output;
- (b) monitor displacement of an accelerator pedal;
- (c) disengage the first and second clutches upon release of the accelerator pedal to an undisplaced position;
- (d) operate the first coupler to maintain a drive connection between the output and the current gear;
- (e) determine a target gear;
- (f) operate the target gear to determine a preselected gear;
- (g) actuate a second coupler to produce a drive connection between the output and the preselected gear; and
- (h) engage the second clutch to driveably connect the power source to the output through the second coupler and the preselected gear.

* * * * *